United States Patent [19]

Brandstetter

[11] Patent Number: 4,929,953
[45] Date of Patent: May 29, 1990

[54] METHOD AND APPARATUS FOR CONTINUOUS ON LINE RECORDING AND PROCESSING OF SYNTHETIC APERTURE RADAR SIGNALS IN REAL TIME

[75] Inventor: Robert W. Brandstetter, Levittown, N.Y.

[73] Assignee: Grumman Aerospace Corporation, Bethpage, N.Y.

[21] Appl. No.: 291,008

[22] Filed: Dec. 28, 1988

[51] Int. Cl.$^5$ .............................................. G01S 9/42
[52] U.S. Cl. ...................................... 342/190; 342/25
[58] Field of Search ........................... 342/25, 190, 191

[56] References Cited

U.S. PATENT DOCUMENTS

| | | |
|---|---|---|
| 3,155,451 | 11/1964 | Dunster et al. |
| 3,157,874 | 11/1964 | Altar et al. |
| 3,526,893 | 9/1970 | Skenderoff et al. |
| 3,560,973 | 2/1971 | Kazel |
| 3,569,967 | 3/1971 | Geadreu et al. |
| 3,636,838 | 1/1972 | Chang et al. |
| 3,725,915 | 4/1973 | Herman et al. ............... 342/ |
| 3,787,840 | 1/1974 | Dotson |
| 3,851,244 | 11/1974 | Wood ........................ 342/ |
| 3,905,031 | 9/1975 | McCord ..................... 342/ |
| 3,950,747 | 4/1976 | Waddoups |
| 3,976,354 | 8/1976 | Braitberg et al. |
| 3,984,802 | 10/1976 | Lippel, Jr. et al. |
| 4,101,891 | 7/1978 | Jain et al. |
| 4,108,538 | 8/1978 | Felstead |
| 4,355,311 | 10/1982 | Jain |
| 4,371,946 | 2/1983 | Constantinides et al. |

OTHER PUBLICATIONS

L. J. Cutrona et al., "On the Application of Coherent Optical Processing Techniques to Synthetic-Aperture Radar", Proceedings of the IEEE, vol. 54, No. 8, Aug. 1966.
C. W. Sherwin et al., "Some Early Developments in Synthetic Aperture Radar Systems", IRE Transactions on Military Electronics.

Primary Examiner—Thomas H. Tarcza
Assistant Examiner—Mark Hellner
Attorney, Agent, or Firm—Scully, Scott, Murphy & Presser

[57] ABSTRACT

A method and apparatus for real time SAR recording and processing includes a first movable recording medium in the form of a rotatable disc having reusable and erasable photosensitive materials thereon to record SAR returns in the form of radial traces. The first recording medium is rotated to move successively through a write zone where the SAR returns are recorded and a read zone where the recorded SAR returns are optically processed to produce a SAR image. The SAR image is recorded on a second rotatable recording medium having reusable and erasable photosensitive materials. The second rotatable recording medium moves successively through a record zone where the SAR image is recorded in a transfer zone where the SAR image is interfaced with a further optical processing system such as an optical correlator.

36 Claims, 2 Drawing Sheets

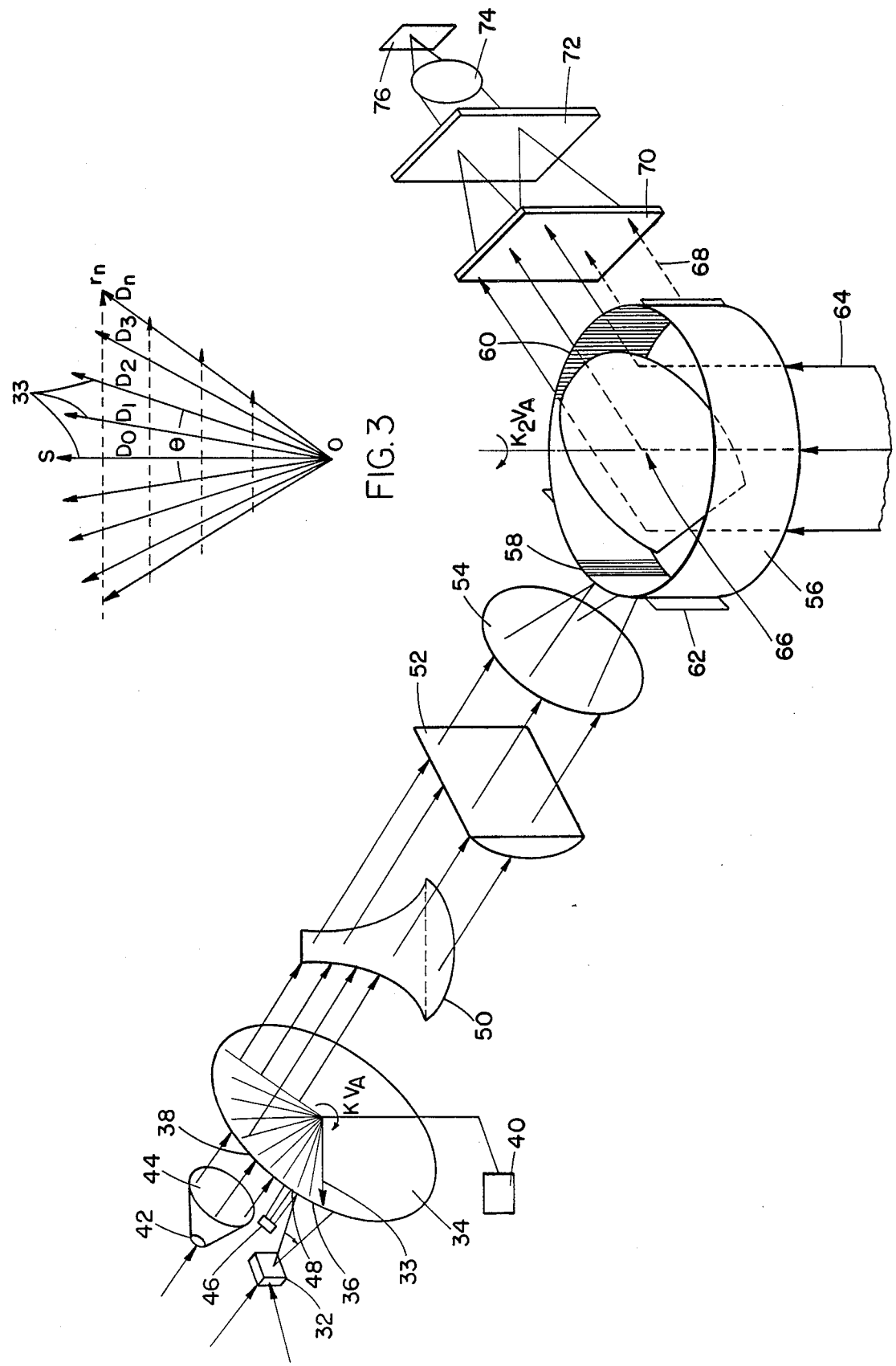

METHOD AND APPARATUS FOR CONTINUOUS ON LINE RECORDING AND PROCESSING OF SYNTHETIC APERTURE RADAR SIGNALS IN REAL TIME

BACKGROUND OF THE INVENTION

1. Field of the Invention

This invention relates to synthetic aperture radar systems for use in target recognition and more particularly, the use of optical techniques to record and process SAR data in real time.

2. Description of the Prior Art

In airborne radar imagery for ground mapping, an aircraft carries a side looking antenna that transmits pulses while the aircraft is in level flight. The slant range coordinate, R, is defined in the plane joining the radar trajectory and any target under consideration, in a direction normal to the aircraft flight path. The azimuth or crossrange coordinate is defined in the direction along the flight path. The slant range resolution is a function of the effective transmitted pulse width while the azimuth resolution is set by the dimensions of the antenna, which at best, is diffraction limited. For an antenna with a diameter D, the cross-range resolution is approximately $\lambda R/D$ where $\lambda$ is the transmitted RF wavelength. By increasing the antenna diameter, the cross-range resolution can be increased, being limited only by practical antenna size and weight considerations. Airborne platforms, however, impose severe physical limitations on the size of the antenna which can be used and still maintain acceptable flight characteristics of the aircraft. For instance, an antenna might approach the dimensions of the airborne platform as in a conformal array, however, such large sized antennas are obviously incapable of being carried by an aircraft.

Synthetic aperture radar (SAR) is a method of obtaining enhanced cross-range resolution utilizing a small side looking antenna that can be easily carried by an aircraft. The antenna is carried by the aircraft to a sequence of positions in which the antenna, at each position, radiates a pulse and receives and stores the reflected signal. The SAR in effect generates an array in space which can be made many times greater than the airborne platform. The effect is to obtain high resolution imagery from radar data which otherwise would not be obtainable. The stored data is then processed to recreate the image of the illuminated area seen by the radar.

SAR signal processing can be mathematically described as either a correlation or a filtering process which includes all the coherent returns stored during an aperture time. The SAR image reconstruction process thus requires a large data storage and dynamic range capability and the ability to process all these data within one interpulse period. In addition, focusing of the data is necessary for optimum cross-range resolution, and compensation for non-uniform aircraft motion is also desirable. Two general classes of SAR data processing have been used for image reconstruction; optical and digital.

In a conventional optical processing system, as shown in FIG. 1(a), the raw SAR data is recorded on a photosensitive material 12 for storage and subsequent processing to recreate the target image. The radar receiver output is a sequence of reflected range pulses which are used to intensity modulate a cathode ray tube 14 in which the electron beam is swept in synchronism with the returning pulses. The CRT produces a succession of range traces 16 that are projected by lens 18 onto the film 12. The data film 12 moves with a translational speed synchronized to the velocity of the aircraft so that the traces are recorded side-by-side thereby producing a two dimensional format in which the dimension across the film represents range, and the dimension along the film corresponds to the azimuth dimension.

To process the SAR image, the SAR record must first be corrected for depression and divergence angle to obtain mutually collimated virtual images of the cross and slant range data. This is accomplished, as shown in FIG. 1(b), by use of a conical lens 20 curved in the azimuth direction and a cylindrical lens 22 curved in the range direction. The film 12 having the raw SAR data thereon is illuminated by a spatially coherent plane wave. The plane wave is diffracted by the traces which act as one dimensional Fresnel zone-plate lenses. The azimuth focal plane of the diffracted wave, which is tilted due to the angle of the radar signals with respect to the flight path, is erected and moved to infinity by the conical lens 20. The cylindrical lens 22 operates only in the range dimension and images the signal film plane at infinity. The spherical lens 24 operates in both dimensions, takes the image at infinity and reimages it at its focal plane where the image is sharply focused in each dimension. The spherical lens focuses both locus planes from infinity onto the image film 26 which is moving synchronously with the data film 12. The image film is exposed by means of a vertical slit 28 in an opaque screen 30 to remove parallax effects to imaged targets at different azimuth positions. A discussion of the conventional SAR recording and processing techniques may be found in Cutrona, et al. *On the Application of Coherent Optical Processing Techniques to Synthetic Aperture Radar*, Proceedings of the IEEE, Vol. 54, No. 8, August, 1966.

The optical recording and processing of synthetic aperture radar signals have certain deficiencies. The chemical film development and handling is usually carried out in a ground based vehicle rather than the aircraft. The resulting time lag between the data acquisition and the image formation is unacceptable in many applications.

U.S. Pat. No. 3,787,840 discloses a method and apparatus for recording synthetic aperture radar data for processing the data in a radar optical correlator for target recognition. A finite length of film extending between reels is utilized to record the SAR data utilizing the conventional CRT technique and to subsequently process the data as the film moves through and optical correlator system. While the system provides for the recording and processing of SAR data suitable for an airborne environment, the system is limited by the length of film available. In many applications, such as military target recognition, there is a need for a continuous on line real time recording and processing synthetic aperture radar system.

SUMMARY OF THE INVENTION

The present invention is directed to a real time SAR processing system in which recording and processing of synthetic aperture radar returns may be performed in a continuous on line system suitable for an airborne environment. In accordance with the present invention, the raw SAR data is optically stored on erasable and reusable photosensitive materials so that new data may be continuously recorded and processed. The SAR image is recorded on a first reusable recording medium and is processed to record the SAR image on a second reusable recording medium which is adapted to interface with a further processing system such as an optical correlator.

A first movable recording medium such as a rotatable disc is successively movable through a write zone and a read zone. The disc is comprised of a transparent material such as a Mylar film having reusable photosensitive materials thereon, such as photochromic or thermal plastic materials. Means are provided for recording the SAR data on the movable recording medium as the medium passes through the write zone. Means are also provided for processing the SAR data as the recording medium passes through the read zone to produce a SAR image in real time. The system in accordance with the invention includes means for continuously moving the recording medium through the read and write zones to continuously record and process new SAR data. The reusable photosensitive materials are of the type that may be reused by merely recording the new data over the old data. In a preferred embodiment, means for erasing the SAR data subsequent to the processing of the data but prior to the new data being recorded is provided.

The SAR data is recorded at the write zone by the conventional cathode ray tube technique described above in the prior art system. Alternatively, a laser light source may be utilized. The SAR data is recorded in the form of a series of radial traces on the rotatable disc that are recorded line by line as the disc rotates. By convention, the disc rotates at a rate proportional to the aircraft velocity. A source of coherent light such as a laser directs a light beam through a collimated lens for directing a collimated beam onto the recording medium at the read zone. A source of high intensity light may be positioned between the read and write zones to erase the radial traces and return the reusable photosensitive materials to a transparent state. A suitable drive means rotates the disc to continuously pass through the write and read zones so that new SAR data may be continuously recorded and processed without the need for changing the film.

The SAR optical processing elements include an aspheric lens curved in the azimuth direction and a cylindrical lens curved in the range direction to focus the azimuth and range planes of the data to infinity, and a spherical lens to focus both planes to a sharp SAR image. The Fresnel zone plate lens formed by each of the radial traces is actually recorded in a cone-like shape with the apex of the cone toward the center of the rotating disk and the bottom of the cone toward the circumference of the disk. The cone shape of the SAR data processed in the read zone has the focusing properties of a conical lens combined with a reciprocal focal length lens. This requires that the lens curved in the azimuth direction be aspheric to erect the azimuth plane in the same manner as the conical lens of the prior art system shown in FIG. 1(b).

The SAR image is focused onto a second movable recording medium having reusable photosensitive materials thereon to record the SAR image. The second movable recording medium is adapted to interface with a further processing system such as an optical correlator and may be in the form of a cylindrical drum. The drum successively moves through a record zone where SAR images are recorded and a transfer zone where the image is processed by the optical correlator for target recognition. Suitable drive means are provided to continuously move the drum through the record and transfer zones to continuously record and process new SAR images. In connection with the use with an optical correlator, a means for directing a collimated light beam through the recording medium is provided at the transfer zone which will spatially modulate the beam with the SAR image for subsequent correlation and target recognition.

BRIEF DESCRIPTION OF THE DRAWINGS

FIG. 2 is a schematic diagram of the real time recording and processing SAR data system of the present invention.

FIG. 3 is a schematic representation of a section of the recording disk of the system of FIG. 2.

DETAILED DESCRIPTION OF THE INVENTION

Figure 1A:
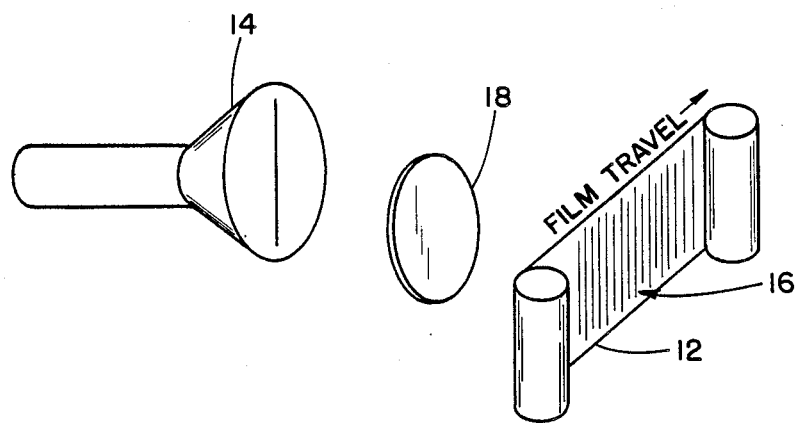
FIG. 1a is a schematic diagram of the conventional system for optical recording of SAR data.
Figure 1B:
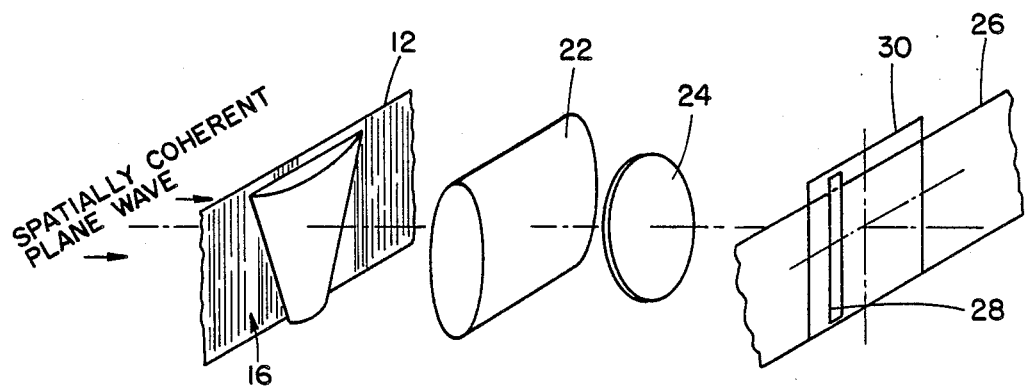
FIG. 1b is a schematic diagram of a conventional prior art system for optical processing of SAR data.

Referring now to the drawings, FIG. 2 is a schematic diagram of the real time SAR recording and processing system of the present invention. In addition, FIG. 2 shows the interface of the inventive system with an optical correlator system. Generally, the system of the invention includes the combination of SAR recording means, SAR processing means and SAR image transfer means.

The SAR recording means includes means 32 for producing a light beam modulated with the synthetic aperture radar return signal from an airborne side looking antenna, not shown. Means 32 may be a conventional cathode ray tube in which the vertical sweep is intensity modulated with the SAR return. A DC bias level is added to the signals so that the modulated signal is always positive. The received signal corresponding to one transmitted SAR return pulse is translated into a brightness modulated radial CRT trace 33 which is projected onto a rotating recording medium 34. A lens may be provided between the means 32 and the medium 34 to focus the trace onto the medium 34.

In another embodiment, the means 32 may be a laser light source that is intensity modulated with the SAR return. By utilizing a scanned laser beam to generate the SAR data to be recorded on the medium 34, the optical beam power density can be made several orders of magnitude greater than conventional flying spot CRT scanners. This higher power density permits the selection of a wide range of photosensitive materials including photochromics.

The recording medium 34 is provided in the form of a rotatable disc comprised of a transparent material having a photosensitive emulsion thereon. The disc 34 rotates with a rotational speed proportional to and synchronized to the velocity of the aircraft carrying the antenna. The rotatable recording medium 34 is successively rotated through a write zone 36 and a read zone 38. A suitable drive means 40 is coupled to the disc 34 and operates to preserve the synchronization between the aircraft velocity and the speed at which the recording medium is rotated. The SAR data is therefore recorded as a series of radial traces 33 on the recording medium 34.

The SAR processing means includes a means 42 for directing a light beam onto the recording medium at the read zone 38 to produce a resultant beam diffracted by the SAR data recorded on the medium 34. The light source 42 may be a source of coherent or noncoherent light. For example, the light source may be a laser such as a semiconductor or a gas laser, a low pressure lamp or a light emitting diode. A lens 44 may be provided to convert the light beam from the source 42 into a beam of collimated light that is directed onto the recording medium at the read zone 38. The radial traces 33 recorded on the medium 34 act as one dimensional Fresnel zone plates that diffract the laser light and allow an optical reconstruction of the radar reflectivity distribution of the actual target field.

The photosensitive material comprising the recording medium 34 is made of any suitable reusable materials. The term reusable means the ability to record new SAR data on areas of the recording medium on which SAR data has already been recorded. Examples of such materials are photochromics and thermal plastic materials. In one embodiment, the new SAR data is recorded over old SAR data thereby erasing the old SAR data. Alternatively, means may be provided to erase the old SAR data prior to that portion of the recording medium again passing the write zone. As shown in FIG. 2, means 46 directs the erasing light beam in an erase zone 48 located between the read zone 38 and the write zone 36 in the direction of movement of medium 34. The means 46 may be any source of high intensity light that will change the recording medium back to its original transparent condition ready for recordation of another radial trace. The use of the reusable rotatable recording medium permits the continuous recording and processing of SAR return data without the prior art limitations accompanying systems having nonreusable materials.

After the SAR recording is made, optical processing means are used to reconstruct the SAR image. The optical processing elements include an aspheric lens 50 and a cylindrical lens 52 positioned downstream of the recording medium 34 to correct the diffracted light beam from the recording medium for depression and divergence angle to obtain mutually collimated virtual images of the cross and slant range data. The mutually collimated virtual images are then focused onto a real image plane by spherical lens 54 for process recording one line at a time. This operation is iterative with each range line advanced proportional to the platform ground speed until all the data has been processed to produce a complete enhanced SAR image.

The radial traces 33 recorded on the circular recording disk 34 in accordance with the present invention, result in cone shaped one dimensional Fresnel zone plate lenses having the focusing properties of a conical lens whose focal length varies as the square of the distance from the center of the disc 34. FIG. 3 represents a section of the disc recording 34 where 0 in the center of the disc and the radial traces 33 form one dimensional Fresnel lenses $D_o, D_1, D_2, D_3, D_n$, having radial axes $r_o, r_1, r_2, r_3, r_n$.

For each value of r, the disc 34 provides a different focal length, f. The SAR disc recording produces a one dimensional Fresnel lens which has a focal length $f_{Dn}$ along a given axis $r_n$ which varies as the square of the distance S from the disc center and is given by the equation:

$$f_{Dn} = (Sn)2/n\lambda = (S)^2 n/\lambda \qquad (1)$$

In the conventional SAR, the conical lens is prescribed to align the cross track and slant range virtual images at infinity. The conical lens has a focal length that varies linearly with the distance from the center. Therefore, lens 50 in FIG. 2 must be formulated such that it modifies the effective focal length given in eq.(1) to obtain a new focal length that varies linearly with S as:

$$f_{D/C} = f_D(k_2/S) \qquad (2)$$

or $$f_{D/C} = k_2 S^2 n/\lambda \qquad (3)$$

Thus, in the present invention, aspheric lens 50 is curved such that the combination of lenses 50 and 52 preserve the range and cross-range resolution as they move the images to infinity. The specific shape of aspheric lens 50 will be dependent on the size of the applicable elements and may, for example, take the form of a hyperbolic lens or any other aspheric shape. The spherical lens 54 then focuses both locus planes from infinity into a form to reconstruct the SAR image.

The SAR image is focused onto a second movable recording medium 56 comprised of a transparent material having reusable photosensitive materials thereon. The recording medium 56 is shown in FIG. 2 in the form of a rotatable drum that is successively movable through a record zone 58 and transfer zone 60. An opaque screen or mask 62 is positioned at the record zone 58 having a vertical aperture, not shown, through which the focused beam of the SAR image passes prior to recordation on the medium 56. The mask is provided to remove parallax effects of image targets at different azimuth positions in accordance with conventional SAR optical image reconstruction.

The rotatable drum 56 presents the recorded SAR image to a transfer zone 60 and therefore acts as an interface with an appropriate image processing system. As an example, FIG. 2 shows such a system as an optical correlator. A collimated laser beam 64 is directed by mirror 66 through the SAR image at the transfer zone 60. A laser beam 68, modulated with the processed SAR image, is then projected onto a holographic lens 70 which focuses a plurality of Fourier transformed beams onto the matched filter 72. The beams are passed through an inverse Fourier lens 74 and the presence of a matched target is represented on detector located at a correlation plane 76.

After the SAR data is transferred to the optical correlator, the area of the recording medium 56 containing the data is translated to the record zone 58 whereupon new SAR data is recorded. Optionally, an erasing means 63 similar to the means 46 described above may also be provided to erase the SAR image prior to the new images being recorded on the medium 56.

Thus, the present invention provides a real time SAR optical system in which SAR return signals may be recorded and processed in a single system suitable for an airborne environment and having the ability to interface with an image processing system in real time.

The present invention utilizes a rotatable disc recording medium having erasable and reusable photosensitive materials so that the SAR return signals can be recorded and processed continuously without the need to change the film. The SAR return signals are inputted to a laser modulated-deflector or an electron gun deflector which produces a slant range image line scan versus cross-range on the photosensitive material in the form of a series of radial traces. The traces are recorded line by line and appear as one dimensional Fresnel zone plates for cross-range. The slant range appears as a series of point scatterers appearing as density modulation along the access dimension. When the recording has been completed a second collimated laser beam is shuttered on to illuminate the SAR data to produce the SAR image. Conventional cylindrical, spherical as well as aspheric lenses are utilized to focus the image onto a rotatable drum having reusable recording materials to record the SAR image and provide an interface for further processing of the image.

While illustrative embodiments of the subject invention have been described and illustrated, it is obvious that the various changes and modifications can be made therein without departing from the spirit of the present invention which should be limited only by the scope of the appended claims.

What is claimed is:

1. A real time SAR recording and processing system comprising:
    a first movable recording medium being successively movable through a write zone and a read zone, said first movable recording medium being comprised of reusable material;
    means for recording SAR data on said first movable recording medium as said recording medium passes through said write zone;
    means for processing said SAR data as said first movable recording medium passes through said read zone to produce an SAR image in real time; and
    means for continuously moving said first movable recording medium through said write and read zones to continuously record and process new SAR data on said first movable recording medium on an area of said first movable recording medium on which SAR data has been previously recorded and processed.

2. The system of claim 1 wherein said first movable recording medium comprises a rotatable disc having the SAR data recorded thereon as a series of radial traces.

3. The system of claim 2 wherein said reusable material is a photochromic material.

4. The system of claim 2 wherein said reusable material is a thermoplastic material.

5. The system of claim 2 further including means for erasing the SAR data on said first recording medium at an erase zone subsequent to said data being processed, said erase zone being located between said read zone and said write zone in the direction of movement of the recording medium.

6. The system of claim 2 wherein said means for recording SAR data includes first means for directing a light beam intensity modulated by SAR return data on said first recording medium at said write zone to successively record said series of radial traces on said first recording medium.

7. The system of claim 6 wherein said means for processing said SAR data includes second means for directing a light beam on said first recording medium at said read zone to produce a resultant beam diffracted by said SAR data, and means for focusing the resultant beam to produce said SAR image.

8. The system of claim 6 or 7 wherein said first and second means for directing a light beam are sources of coherent light.

9. The system of claim 8 wherein the source of coherent light is a laser.

10. The system of claim 7 wherein said second means for directing a light beam includes a source of coherent light and means for forming the coherent light beam into a beam of collimated light and for directing the beam of collimated light onto said first recording medium.

11. The system of claim 7 wherein said means for focusing the resultant beam includes an aspheric lens and a cylindrical lens having their axes perpendicular to each other, said aspheric and cylindrical lenses being aligned parallel with said rotatable disc, and a spherical lens aligned parallel with said cylindrical lenses and positioned downstream of said cylindrical lenses.

12. The system of claim 11 further including means for recording said SAR image.

13. The system of claim 12 wherein said means for recording said SAR image includes an interface means for transferring said SAR image for further processing in real time.

14. The system of claim 13 wherein said interface means includes a second movable recording medium being successively movable through a record zone and a transfer zone.

15. The system of claim 14 wherein said second movable recording medium is comprised of reusable material.

16. The system of claim 15 further including means for continuously moving said second movable recording medium through said record and transfer zones to continuously record and process new SAR images on said second movable recording medium.

17. The system of claim 16 wherein said second movable recording medium comprises a rotatable drum having the SAR image recorded thereon.

18. The system of claim 17 wherein said reusable material is a photochromic material.

19. The system of claim 17 wherein said reusable material is a thermoplastic material.

20. The system of claim 17 further including means for erasing the SAR image on the recording medium subsequent to the image passing the transfer zone in an erase zone located between said transfer zone and said record zone in the direction of movement of the recording medium.

21. The system of claim 17 wherein said rotatable disc and said rotatable drum are driven by drive means adapted to drive said disc and drum synchronously with each other.

22. The system of claim 13 wherein said interface means is adapted to transfer the SAR image to an optical correlator system.

23. The system of claim 22 further including third means for directing a collimated light beam through said second recording medium at said transfer zone to spatially modulate the collimated light beam with the SAR image for correlation in said optical correlator system.

24. A method of recording and processing SAR returns in real time, comprising the steps of:
    successively moving a first recording medium comprised of reusable materials through a write zone and a read zone;
    recording SAR data on said first reusable recording medium at said write zone;
    processing the SAR data at said read zone for producing a SAR image in real time; and
    continuously moving said first reusable recording medium through said write and read zones to continuously record and process new SAR data on said first recording medium on an area of said first recording medium on which SAR data has been previously recorded and processed.

25. The method of claim 24 further including the step of erasing the processed SAR data in an erase zone located between said read zone and said write zone in the direction and movement of the first recording medium.

26. Method of claim 25 wherein the step of recording the SAR data includes directing a light beam intensity modulated by SAR return data on said first recording medium at the write zone.

27. The method of claim 26 wherein the step of recording the SAR data includes recording a series of radial traces on said first recording medium.

28. The method of claim 27 wherein the step of processing the SAR data includes directing a light beam on the first recording medium at the read zone to produce a resultant beam diffracted by the SAR data.

29. The method of claim 28 wherein the processing step includes focusing the resultant beam to produce the SAR image.

30. The method of claim 29 further including the step of recording the SAR image.

31. The method of claim 30 wherein the recording step includes moving a second reusable recording medium successively through a record zone and focusing the SAR image onto the second recording medium at said record zone.

32. The method of claim 31 further including the step of moving said second recording medium successively through a transfer zone for interfacing the SAR image with a further processing system.

33. The method of claim 32 including the step of continuously moving said second recording medium through said record and transfer zones to continuously record and further process new SAR images.

34. The method of claim 33 further including erasing the SAR image subsequent to the image passing the transfer zone in an erase zone located between the transfer zone and the record zone in the direction of movement of the recording medium.

35. The method of claim 34 including synchronously rotating the first and second recording mediums in synchronization with each other.

36. The method of claim 35 further including the step of transferring the SAR image to an optical correlator system for target recognition.

* * * * *